(12) United States Patent
Kuan et al.

(10) Patent No.: US 12,350,823 B2
(45) Date of Patent: Jul. 8, 2025

(54) TRANSMISSION DEVICE WITH MULTIPLE DEGREES OF FREEDOM AND ROBOT

(71) Applicants: SHANGHAI FLEXIV ROBOTICS TECHNOLOGY CO., LTD., Shanghai (CN); FLEXIV LTD., Grand Cayman (KY)

(72) Inventors: Chi-Tao Kuan, Santa Clara, CA (US); Hao Jiang, Santa Clara, CA (US); Shuhan Li, Santa Clara, CA (US)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 0 days.

(21) Appl. No.: 18/257,374

(22) PCT Filed: Sep. 1, 2022

(86) PCT No.: PCT/CN2022/116489
§ 371 (c)(1),
(2) Date: Jun. 14, 2023

(87) PCT Pub. No.: WO2024/045127
PCT Pub. Date: Mar. 7, 2024

(65) Prior Publication Data
US 2024/0391089 A1    Nov. 28, 2024

(51) Int. Cl.
*B25J 3/02*      (2006.01)
*B25J 9/00*      (2006.01)
*B25J 9/10*      (2006.01)

(52) U.S. Cl.
CPC ............. *B25J 3/02* (2013.01); *B25J 9/0048* (2013.01); *B25J 9/102* (2013.01)

(58) Field of Classification Search
CPC ............. B25J 3/02; B25J 9/0048; B25J 9/102
(Continued)

(56) References Cited

U.S. PATENT DOCUMENTS 6,330,837 B1    12/2001    Charles et al.
2008/0257096 A1*  10/2008    Zhu .................. B25J 17/0266
                                            700/245
(Continued)

FOREIGN PATENT DOCUMENTS

CN    101292935 A    10/2008
CN    102689305 A     9/2012
(Continued)

OTHER PUBLICATIONS

International Search Report and Written Opinion from International Application No. PCT/CN2022/116489 mailed May 25, 2023.
(Continued)

*Primary Examiner* — Kira Nguyen
(74) *Attorney, Agent, or Firm* — Dorsey & Whitney LLP

(57) ABSTRACT

A transmission device with multiple degrees of freedom includes a first platform, a second platform, a fixing platform, first branch chains, second branch chains and transmission assemblies. The first branch chains, the first platform (10) and the fixing platform form a first multiple degrees of freedom parallel mechanism having an output end. The second branch chains, the second platform and the fixing platform form a second multiple degrees of freedom parallel mechanism having an input end. A structure of the second branch chain is similar to a structure of the first branch chain, and a size of the second branch chain is enlarged or reduced in proportion to that of the first branch chain. The transmission assemblies are configured to couple the output end to the input end.

20 Claims, 6 Drawing Sheets

(58) Field of Classification Search
USPC .......................................................... 700/245
See application file for complete search history.

(56) References Cited

U.S. PATENT DOCUMENTS

| | | | | |
|---|---|---|---|---|
| 2018/0236655 A1* | 8/2018 | Nakanishi | ................ | B25J 9/126 |
| 2021/0094168 A1* | 4/2021 | Meng | ........................ | B25J 9/107 |
| 2022/0234192 A1* | 7/2022 | Xu | ........................... | B25J 9/003 |
| 2023/0074130 A1* | 3/2023 | Sun | ........................ | B25J 9/0009 |
| 2023/0398681 A1* | 12/2023 | Xie | ........................ | B25J 11/005 |

FOREIGN PATENT DOCUMENTS

| | | | |
|---|---|---|---|
| CN | 104950797 | A | 9/2015 |
| CN | 105881512 | A | 8/2016 |
| CN | 107139165 | A | 9/2017 |
| CN | 107932485 | A | 4/2018 |
| CN | 107932487 | A | 4/2018 |
| CN | 109531561 | A | 3/2019 |
| CN | 111214291 | A | 6/2020 |
| CN | 112917459 | A | 6/2021 |
| FR | 2957001 | A1 | 9/2011 |
| JP | 2010247280 | A | 11/2010 |
| WO | 2019126919 | A1 | 7/2019 |

OTHER PUBLICATIONS

Office Action for Chinese Application No. 202211065296.6 mailed Apr. 25, 2025,.

* cited by examiner

TRANSMISSION DEVICE WITH MULTIPLE DEGREES OF FREEDOM AND ROBOT

This application is a U.S. Nationalization of PCT International Application No. PCT/CN2022/116489 filed Sep. 1, 2022, the disclosure of which is incorporated herein, in its entirety, by this reference.

TECHNICAL FIELD

The present disclosure relates to transmission devices, and in particular to a transmission device with multiple degrees of freedom and a robot.

BACKGROUND

In many industrial scenarios, it is necessary to increase output force and torque. For example, to achieve a product production process, it is possible to provide a relatively small force and torque at the input end if force and torque amplification technology and device are implemented. In the prior art, a reduction box or a torque converter is usually used to increase the output force and torque. However, the above-mentioned ways to increase the output force and torque are limited to only one spatial degree of freedom. In the industry, more and more parallel manipulators are used to perform operations such as grasping and moving workpieces in three-dimensional space. The existing parallel manipulators cannot increase the output force and torque on multiple degrees of freedom. Therefore, when the workpiece is grasped and moved, it is necessary to load enough force and torque on a force receiving portion of the parallel manipulator to complete the above operations, which undoubtedly limits the use of the parallel manipulator.

SUMMARY

Accordingly, it is necessary to provide a transmission device with multiple degrees of freedom and a robot configured to solve the problem that the force and torque on multiple degrees of freedom cannot be increased the output in the prior art.

A device of automatically detecting nucleic acid includes: a first platform, a second platform, a fixing platform provided between the first platform and the second platform, a plurality of first branch chains, a plurality of second branch chains and a plurality of transmission assemblies: wherein the plurality of first branch chains are arranged in parallel between the first platform and the fixing platform: the plurality of first branch chains, the first platform, and the fixing platform constitute a first multiple degrees of freedom parallel mechanism: wherein the plurality of second branch chains are arranged in parallel between the second platform and the fixing platform: the plurality of second branch chains, the second platform, and the fixing platform constitute a second multiple degrees of freedom parallel mechanism, wherein a structure of the second branch chains is similar to a structure of the first branch chains, and a size of the second branch chains is enlarged or reduced in proportion to a size of the first branch chains: wherein the plurality of transmission assemblies are coupled between the plurality of first branch chains and the plurality of second branch chains and configured to couple an output end of the first multiple degrees of freedom parallel mechanism to an input end of the second multiple degrees of freedom parallel mechanism.

In an embodiment, the transmission assembly couples the output end of the first multiple degrees of freedom parallel mechanism to the input end of the second multiple degrees of freedom parallel mechanism with a speed ratio of 1:1.

In an embodiment, the plurality of first branch chains comprise three first branch chains and the plurality of second branch chains comprise three second branch chains, the three first branch chains, the first platform, and the fixing platform constitute a first 3-RRRS parallel mechanism, and the three second branch chains, the second platform, and the fixing platform constitute a second 3-RRRS parallel mechanism.

In an embodiment, wherein each of the plurality of first branch chains includes a first ball pair, a first rotating pair, a second rotating pair, and a third rotating pair connected in sequence; wherein the first ball pair is connected to the first platform, the third rotating pair is connected to the fixing platform, and the first rotating pair and the second rotating pair are the output end of the first multiple degrees of freedom parallel mechanism: wherein each of the second branch chains includes a second ball pair, a fourth rotating pair, a fifth rotating pair and a sixth rotating pair connected in sequence: wherein the second ball pair is connected to the second platform, the fourth rotating pair is connected to the fixing platform, and the fifth rotating pair and the sixth rotating pair are the input end of the second multiple degrees of freedom parallel mechanism.

In an embodiment, each of the plurality of transmission assemblies includes a first bevel gear connected to the first rotating pair, a second bevel gear connected to the second rotating pair, a third bevel gear connected to the fifth rotating pair, a fourth bevel gear connected to the sixth rotating pair, and a linkage assembly: wherein the linkage assembly is configured to transmit rotation of the first bevel gear to the third bevel gear and to transmit rotation of the second bevel gear to the fourth bevel gear.

In an embodiment, the linkage assembly includes a first transmission shaft group, a second transmission shaft group, and a third transmission shaft group, the first transmission shaft group, the second transmission shaft group, and the third transmission shaft group are rotatably connected to the fixing platform: each of the first transmission shaft group, the second transmission shaft group, and the third transmission shaft group includes a first shaft and a second shaft rotatably received in the first shaft: two ends of the first transmission shaft group are respectively located on two sides of the fixing platform, the second transmission shaft group and the third transmission shaft group are located on one side of the fixing platform, and the first transmission shaft group and the third transmission shaft group are perpendicularly connected to two ends of the second transmission shaft group: both ends of each second shaft are respectively sleeved with a fifth bevel gear, and both ends of each first shaft are respectively sleeved with a sixth bevel gear: the fifth bevel gear and the sixth bevel gear at an end of the first transmission shaft group adjacent to the first branch chain are engaged with the first bevel gear and the second bevel gear respectively: the fifth bevel gear and the sixth bevel gear at an end of the third transmission shaft group adjacent to the second branch chain are engaged with the third bevel gear and the fourth bevel gear respectively: the fifth bevel gears and the sixth bevel gears at two ends of the second transmission shaft group are engaged with the fifth bevel gear and the sixth bevel gear at the end of the first transmission shaft group away from the first branch chain and the fifth bevel gears and the sixth bevel gears at the end of the third transmission shaft group away from the second branch chain, respectively.

In an embodiment, the fixing platform further includes a plurality of supporting plates fixed on a side of the fixing platform where the second transmission shaft group and the third transmission shaft group are located, wherein each of the plurality of supporting plates is provided with a group of supporting holes, and each second transmission shaft group is rotatably received in the group of supporting holes.

In an embodiment, the fixing platform includes a fixing plate, three first connecting frames, and three second connecting frames, the fixing plate includes a central portion and three positioning portions evenly arranged around the central portion at intervals, the three first connecting frames are respectively fixed at one end of the three positioning portions away from the center portion and located on a side of the fixing plate facing the first platform, the three second connecting frames are respectively fixed to one end of the three positioning portions adjacent to the center portion and located on a side of the fixing plate facing the second platform.

In an embodiment, one end of each positioning portion away from the center portion is provided with a first through hole, the first connecting frame includes two first fixing pieces perpendicularly fixed to the fixing plate and a first bearing piece perpendicularly connected between the two first fixing pieces, the first bearing piece is provided with a first positioning hole corresponding to the first through hole, and a part of the transmission assembly is rotatably received in the first through hole and the first positioning hole.

A robot includes the above transmission device with multiple degrees of freedom, wherein the first platform is a force inputting platform, and the second platform is a force outputting platform.

According to the transmission device with multiple degrees of freedom and the robot, on one hand, when the platform connected to the larger one of the first branch chain and the second branch chain acts as the force inputting platform, the force and/or torque received by the force inputting platform is transmit to the force outputting platform connected to the smaller one of the first branch chain and the second branch chain through the two multiple degrees of freedom parallel mechanisms arranged on both sides of the fixing platform, so that the multi-DoF (degrees of freedom) force and/or the torque output to the platform connected to the smaller branch chain can be increased and the displacement output to the platform can be decreased. On the other hand, when the platform connected to the smaller one of the first branch chain and the second branch chain acts as the force inputting platform, the force and/or torque received by the force inputting platform is transmit to the force outputting platform connected to the larger one of the first branch chain and the second branch chain through the two multiple degrees of freedom parallel mechanisms arranged on both sides of the fixing platform, so that the multi-DoF force and/or the torque output to the platform connected to the larger branch chain can be decreased and the displacement output to the platform can be increased. In this way, the output multi-DoF force/torque can be amplified or reduced, or the output multi-DoF displacement can be amplified and reduced as needed.

These and other objects, advantages, purposes and features will become apparent upon review of the following specification in conjunction with the drawings.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
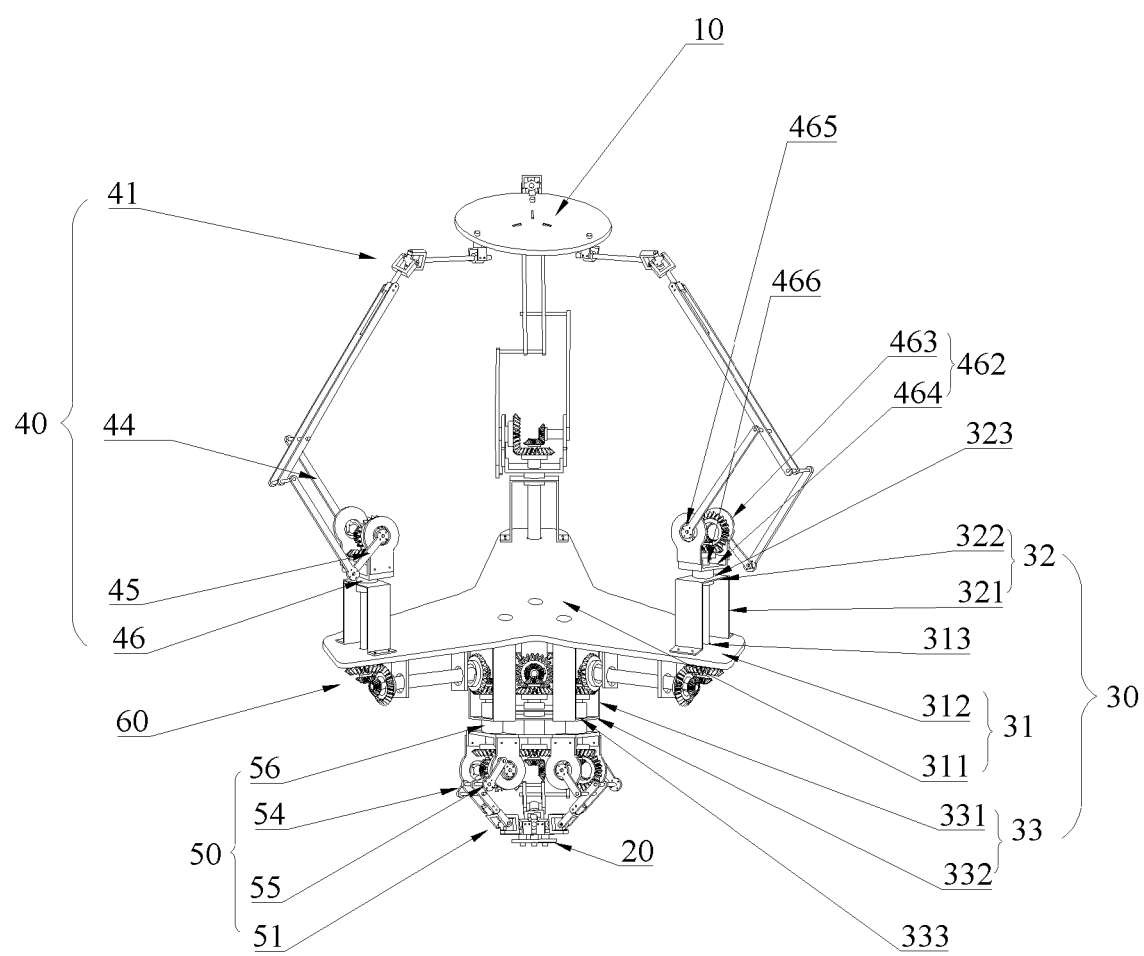
FIG. 1 is a perspective view of a transmission device with multiple degrees of freedom according to an embodiment of the present disclosure.

The present disclosure will now be described in detail with reference to the accompanying drawings and embodiments in order to make the objects, technical solutions, and advantages of the present disclosure more clear. It should be understood that the specific embodiments described herein are only for explaining the present disclosure, and not intended to limit the present disclosure. The components of the embodiments of the present application generally described and illustrated in the drawings herein may be arranged and designed in various different configurations.

Therefore, the following detailed description of the embodiments of the present disclosure provided in the accompanying drawings is not intended to limit the scope of the present disclosure, as claimed, but is merely representative of selected embodiments of the present disclosure. Based on the embodiments in the present disclosure, all other embodiments obtained by those of ordinary skill in the art without creative work fall within the protection scope of the present disclosure.

It should be noted that similar labels and letters indicate similar items in the following figures. Therefore, so once an item is defined in one figure, it does not require further definition and explanation in subsequent figures.

In the description of the embodiments of the present disclosure, it should be understood that the terms "center", "upper", "lower", "left", "right", "vertical", "horizontal", "inner", "outer" etc. indicate the orientation or positional relationship based on the orientation or positional relationship shown in the drawings, or the orientation or positional relationship that is usually placed when the product is used, or the orientation or positional relationship that is commonly understood by those skilled in the art, which is only for the convenience of describing the present disclosure and simplifying the description, rather than indicating or implying that the referred device or element must have a particular orientation, be constructed and operate in a particular orientation, and therefore should not be construed as a limitation of the present application.

Furthermore, the terms "first", "second", etc. are only used to differentiate the description and should not be construed to indicate or imply relative importance.

The technical solutions in the present disclosure will be described below in combination with the accompanying drawings.

Figure 2:
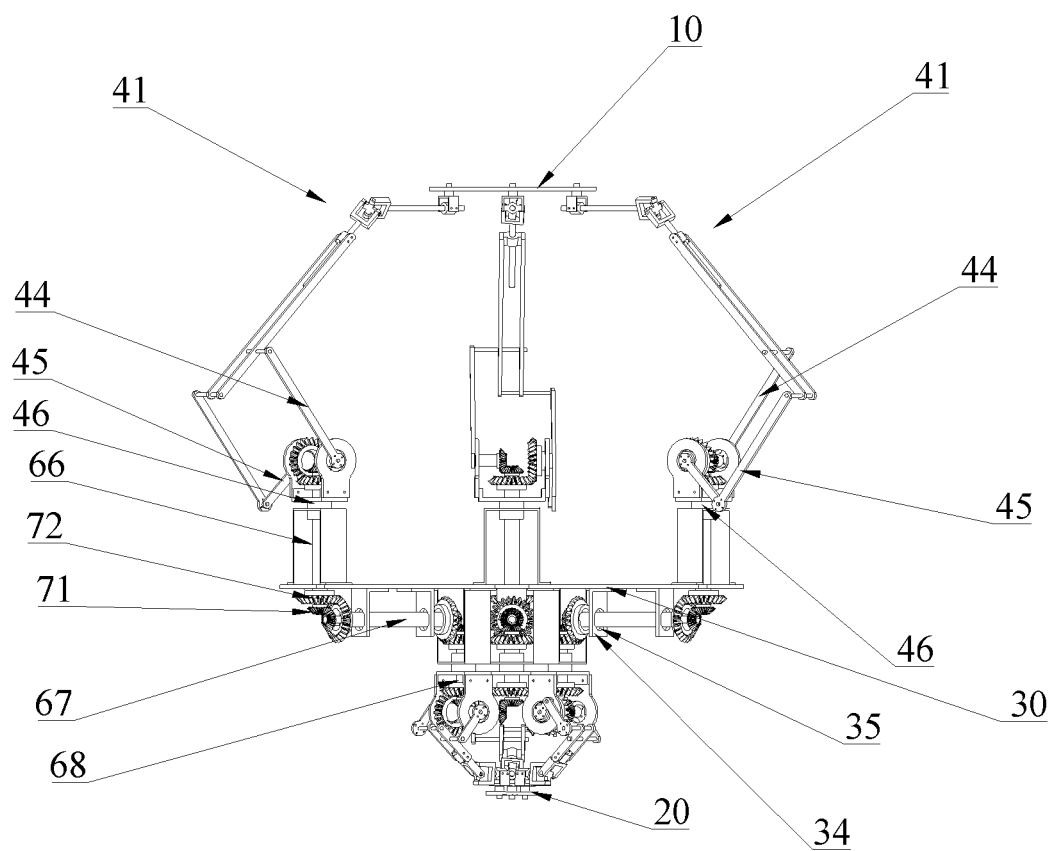
FIG. 2 is a front view of the transmission device shown in FIG. 1.

Referring to FIGS. 1 to 2, according to an embodiment, a transmission device 1 with multiple degrees of freedom is provided, which is configured to transmit force and torque in multiple directions. The transmission device 1 includes a first platform 10, a second platform 20, a fixing platform 30, a plurality of first branch chains 40, a plurality of second branch chains 50, and a plurality of transmission assemblies 60.

The first platform 10 and the second platform 20 are movable platforms. One of the first platform 10 and the second platform 20 is a force inputting platform, that is, a platform that receives external load, and the other is a force outputting platform, that is, a platform that outputs force. The fixing platform 30 is located between the first platform 10 and the second platform 20 and is immovable, such as fixed to a processing machine tool (not shown), or fixed to a bracket fixed on a ground.

The plurality of first branch chains 40 are arranged in parallel between the first platform 10 and the fixing platform 30. The plurality of first branch chains 40, the first platform 10, and the fixing platform 30 constitute a first multiple degrees of freedom parallel mechanism, so that the first platform 10 can receive or output forces and torques in multiple directions.

The plurality of second branch chains 50 are arranged in parallel between the second platform 20 and the fixing platform 30. The plurality of second branch chains 50, the second platform 20, and the fixing platform 30 constitute a second multiple degrees of freedom parallel mechanism, so that the second platform 20 can receive or output forces and torques in multiple directions. The fixing platform 30 can be a platform shared by the first multiple degrees of freedom parallel mechanism and the second multiple degrees of freedom parallel mechanism. Alternatively, the fixing platform 30 may be formed by connecting a stationary platform of the first multiple degrees of freedom parallel mechanism to another stationary platform of the second multiple degrees of freedom parallel mechanism. A structure of the second branch chain 50 is similar to a structure of the first branch chain 40, and a size of the second branch chain 50 is enlarged or reduced in proportion to a size of the first branch chain 40. Specifically, an arrangement of the plurality of second branch chains 50 relative to the fixing platform 30 is substantially the same as an arrangement of the plurality of first branch chains 40 relative to the fixing platform 30. Components of the second branch chain 50 and a connection sequence of the components of the second branch chain 50 are substantially the same as components of the first branch chain 40 and a connection sequence of the components of the first branch chain 40, except that the size of the components of the second branch chain 50 is enlarged or reduced in equal proportion to the size of the corresponding components in the first branch chain 40.

The plurality of transmission assemblies 60 are coupled between the plurality of first branch chains 40 and the plurality of second branch chains 50, and the plurality of transmission assemblies 60 are configured to couple an output end 80 (see FIG. 3) of the first multiple degrees of freedom parallel mechanism to an input end 90 (see FIG. 3) of the second multiple degrees of freedom parallel mechanism. In one embodiment, the plurality of transmission assemblies 60 couple the output end 80 of the first multiple degrees of freedom parallel mechanism to the input end 90 of the second multiple degrees of freedom parallel mechanism with a speed ratio of 1:1. In this implementation, the force, torque and/or displacement output by the output end 80 of the first multiple degrees of freedom parallel mechanism can be the same as the force, torque and/or displacement obtained by the input end 90 of the second multiple degrees of freedom parallel mechanism, so that a rotation angle of the output end 80 of the first multiple degrees of freedom parallel mechanism is the same as the rotation angle of the input end 90 of the second multiple degrees of freedom parallel mechanism. When the external force received by the first platform 10 or the second platform 20 as the force inputting platform is transmitted to the second platform 20 or the first platform 10 as the force outputting platform, the size of the force and/or torque and the displacement on the multiple degrees of freedom in space output by the force outputting platform can be adjusted by a size ratio of the first branch chain 40 and the second branch chain 50.

Through the two multiple degrees of freedom parallel mechanisms placed on two sides of the fixing platform 30, force and/or torque applied on the first platform 10 of the transmission device 1 with no matter which direction (in this situation, the first platform 10 acts as the force inputting platform) may be transmitted to the transmission assemblies 60 through the first branch chains 40, and to the second branch chains 50 through the transmission assemblies 60, and eventually to the second platform 20 (in this situation, the second platform 20 acts as the force outputting platform) through the second branch chains. In this way, the force and/or the torque on the multiple degrees of freedom on the first platform 10 is transmitted to an execution terminal of the second platform 20, and the displacement with multiple degrees of freedom on the first platform 10 is transmitted to the execution terminal of the second platform 20.

Since the first platform 10 and the second platform 20 are movable platforms, and the fixing platform 30 is a fixed platform, the first branch chain 40 and the second branch chain 50 are equivalent to force arms of a lever on two sides of a support point. Furthermore, since the sizes of the components of the second branch chain 50 is enlarged or reduced by the same preset ratio as the size of the corresponding components in the first branch chain 40, when the force and/or torque received by the first platform 10 is transmitted through the transmission device 1, a reduced or amplified force and/or torque will be obtained on the second platform 20, thereby reducing or increasing the force and/or torque applied to the execution terminal of the second platform 20. It should be noted that, in other embodiments, the second platform 20 can be configured to receive torque, and the first platform 10 can be configured to output torque, that is, the second platform 20 acts as the force inputting platform, and the first platform 10 acts as the force outputting platform. When the device is configured to amplify the force and/or torque, a preset action that the execution terminal on the force outputting platform needs to perform can be realized by applying a small force and/or torque to the force inputting platform, such as grasping the workpiece, such that the workpiece can be easily grasped. When the device is configured to reduce the force and/or torque, an execution object at the execution terminal of the force outputting platform can be prevented from being damaged due to large force and/or torque.

In the embodiment shown in FIG. 1, the size of each component of the second branch chain 50 is reduced by the ratio of 2:1 according to the size of the corresponding component in the first branch chain 40. When the first platform 10 is used as the force inputting platform and the second platform 20 is used as the force outputting platform, an increased force and/or torque and a reduced displacement can be obtained on the second platform 20. In this way, an output force/torque amplification function and a displacement reduction function on the spatial multiple degrees of freedom from the first platform 10 to the second platform 20 are realized. When the second platform 20 is used as the force inputting platform and the first platform 10 is used as the force outputting platform, a reduced force and/or torque and an increased displacement can be obtained on the first platform 10. In this way, an output force/torque reduction function and a displacement amplification function on the spatial multiple degrees of freedom from the second platform 20 to the first platform 10 are realized.

Figure 4:
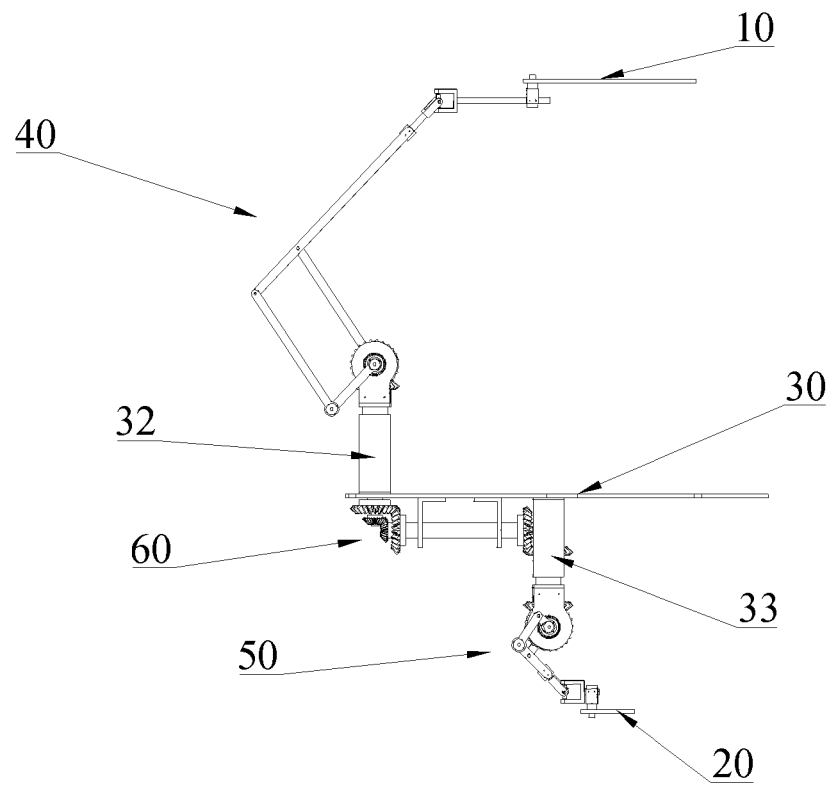
FIG. 4 is a front view of the first branch chain, the transmission assembly, and the second branch chain shown in FIG. 3.

In an embodiment, as shown in FIG. 1 and FIG. 4, the fixing platform 30 is substantially Y-shaped. The fixing platform 30 includes a fixing plate 31, three first connecting frames 32, and three second connecting frames 33. The fixing plate 31 includes a central portion 311 and three positioning portions 312 connected to the central portion 311. The three positioning portions 312 extend outward from the central portion 311 evenly at intervals, and an angle between two adjacent positioning portions 312 is approximately 120°. One end of each of the positioning portions 312 away from the center portion 311 is provided with a first through hole 313. The three first connecting frames 32 are respectively fixed at one end of the three positioning portions 312 away from the center portion 311. In the embodiment, the three first connecting frames 32 are located on a side of the fixing plate 31 facing the first platform 10. The first connecting frame 32 includes two first fixing pieces 321 perpendicularly fixed to the fixing plate 31 and a first bearing piece 322 perpendicularly connected between the two first fixing pieces 321. The first bearing piece 322 is provided with a first positioning hole 323 corresponding to the first through hole 313, and a part of the transmission assembly 60 is rotatably received in the first through hole 313 and the first positioning hole 323. The three second connecting frames 33 are respectively fixed to one end of the three positioning portions 312 adjacent to the center portion 311 and located on a side of the fixing plate 31 facing the second platform 20. A structure of the second connecting frame 33 is similar to that of the first connecting frame 32, which includes two second fixing pieces 331 perpendicularly fixed to the fixing plate 31 and a second bearing piece 332 perpendicularly connected between the two second fixing pieces 331. The second bearing sheet 332 is provided with a second positioning hole 333 configured to rotatably receive another part of the transmission assembly 60.

In some embodiments, the number of the first branch chains 40 is three and the number of the second branch chains 50 is also three. The three first branch chains 40 are evenly arranged between the first platform 10 and the three first connecting frames 32, and the three first branch chains 40 are connected to one end of the three transmission assemblies 60, such that movement between the transmission assemblies 60 and the first branch chains 40 can be transmitted. In some embodiments, the three first branch chains 40, the first platform 10, and the fixing platform 30 constitute a first 3-RRRS parallel mechanism (RRRS refers to kinematic pairs of a branched chain consisting of three Rotational pairs and one Spherical pair). The three second branch chains 50 are evenly arranged between the second platform 20 and the three second connecting frames 33, and the three second branch chains 50 are connected to the other end of the transmission assemblies 60 such that movement between the transmission assemblies 60 and the second branch chains 50 can be transmitted. Three second branch chains 50, the second platform 20, and the fixing platform 30 constitute a second 3-RRRS parallel mechanism. The definition of 3-RRRS parallel mechanism can be referred to the prior arts such as patents CN104950797A, CN101292935A and WO2019126919A1, the entire contents of which are incorporated in the present disclosure. Since a moving platform of the 3-RRRS parallel mechanism has six degrees of freedom in space and two moving platforms of the two 3-RRRS parallel mechanisms are used as an input platform and an output platform of the transmission device 1 respectively, six-DoF space movement can be transmitted from the first platform 10 to the second platform 20. It should be understood that the above-mentioned first branches 40 and second branches 50 are only one embodiment of the six-degree of freedom parallel mechanism. In other embodiments, the structures of the first branches 40 and the second branches 50 may also be other six degree of freedom parallel mechanisms. The first branches 40 and the second branches 50 can also be other multiple degrees of freedom parallel mechanisms, such as three degrees of freedom parallel mechanisms, where three degrees of freedom movement in space between the first platform 10 and the second platform 20 can be achieved.

As shown in FIG. 1, in some embodiments, the first branch chain 40 includes a first ball pair 41, a first rotating pair 44, a second rotating pair 45, and a third rotating pair 46 that are connected in sequence. The first ball pair 41 is connected to the first platform 10, and the third rotating pair 46 is connected to the fixing platform 30. The first rotating pair 44 and the second rotating pair 45 are the output end 80 of the first multiple degrees of freedom parallel mechanism, which is connected to one end of the transmission assembly 60. The first rotating pair 44 and the second rotating pair 45 are connected to the first ball pair 41, and the rotation axis of the first rotating pair 44 is parallel to or coincides with the rotation axis of the second rotating pair 45. The third rotating pair 46 is rotatably connected to the first rotating pair 44 and the second rotating pair 45, and the rotating shaft of the third rotating pair 46 is perpendicular to the rotating shafts of the first rotating pair 44 and the second rotating pair 45. When the first platform 10 is subjected to force and/or torque as the force inputting platform, the force and/or torque is transmitted to the first rotating pair 44 and the second rotating pair 45 through the first ball pair 41, and then the force and/or torque is transmitted to the transmission assembly 60 connected to the first rotating pair 44 and the second rotating pair 45, such that the force and/or torque is further transmitted to the second platform 20 through the transmission assembly 60 and the second branch chain 50. When the movement is transmitted to the transmission assembly 60 by the first rotating pair 44 and the second rotating pair 45, rotations of the first rotating pair 44 and the second rotating pair 45 relative to the fixing platform 30 can be realized through the third rotating pair 46, so as to avoid distortions of the first rotating pair 44 and the second rotating pair 45 during the rotation.

Figure 5:
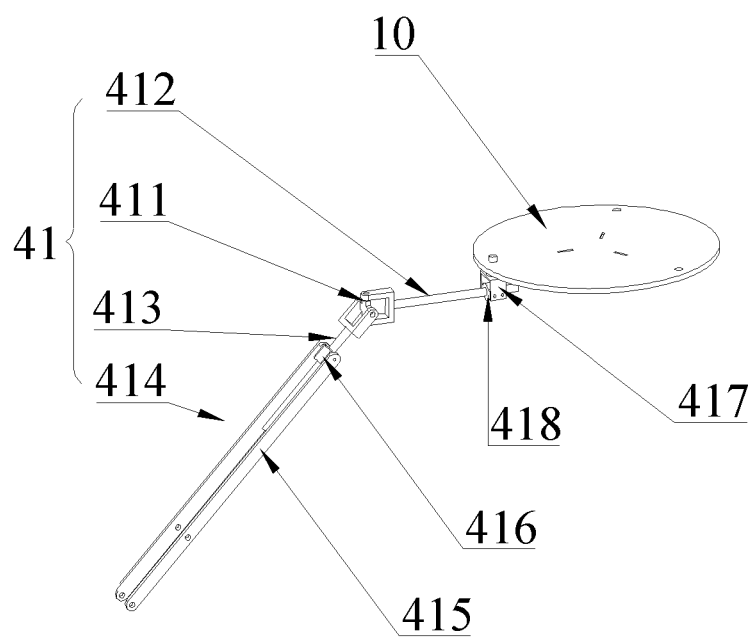
FIG. 5 is a perspective view of a first link assembly according to an embodiment of the present disclosure.

Specifically, referring to FIG. 5, the first ball pair 41 includes a cross shaft universal joint 411, a first rotating rod 412 connected to one end of the cross shaft universal joint 411, a second rotating rod 413 connected to the other end of the cross shaft universal joint 411, and a first link assembly 414. The first rotating rod 412 is rotatably connected to the first platform 10, and the second rotating rod 413 is rotatably connected to the first link assembly 414. In the embodiment, the first platform 10 is substantially circular, three fixing blocks 417 are fixed to an edge of the first platform 10. Each of the fixing blocks 417 is provided with a first bearing 418, and one end of the first rotating rod 412 away from the second rotating rod 413 is rotatably received in the first bearing 418 to realize a rotational connection between the first rotating rod 412 and the first platform 10. A rotation axis of the first rotating rod 412 is a central axis of the first rotating rod 412. The first link assembly 414 includes two first connecting rods 415. The second bearing 425 is fixed between the two first connecting rods 421, and the second rotating rod 413 is rotatably connected to the second bearing 416 to realize the rotational connection between the second rotating rod 413 and the first link assembly 42. A rotation axis of the second rotating rod 413 is a central axis of the second rotating rod 413.

Figure 3:
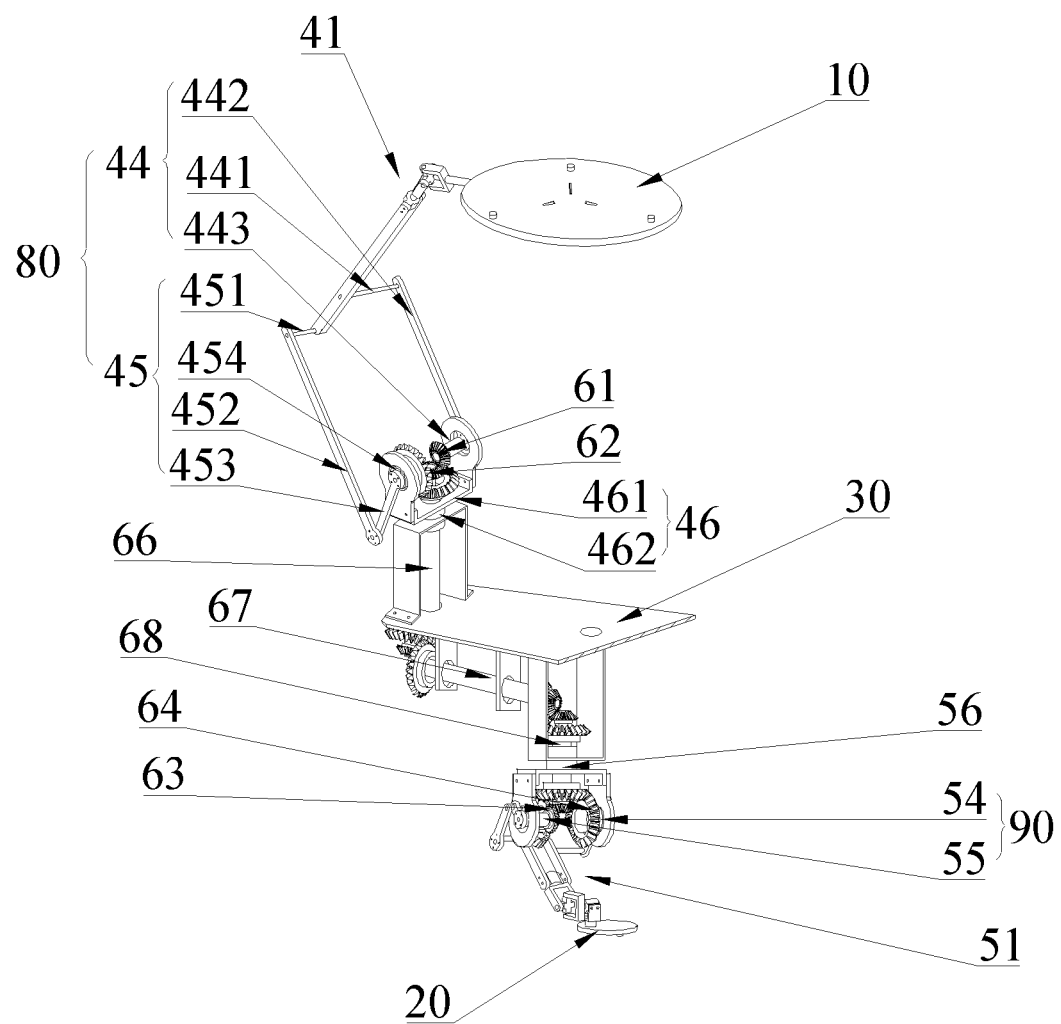
FIG. 3 is a perspective view of a first branch chain, a transmission assembly, and a second branch chain according to an embodiment of the present disclosure.

Referring to FIG. 3, the first rotating pair 44 includes a second connecting rod 441, a third connecting rod 442, and a first rotating shaft 443. One end of the second connecting rod 441 is perpendicularly and rotatably connected to the two first connecting rods 415 of the first link assembly 414, the other end of the second connecting rod 441 is perpendicularly fixed to one end of the third connecting rod 442, and the first rotating shaft 443 is fixedly connected to one end of the third connecting rod 442 away from the second connecting rod 441 and is rotatably connected to the third rotating pair 46. The first rotating shaft 443 and the second connecting rod 441 are located on a same side of the third connecting rod 442.

The second rotating pair 45 includes a fourth connecting rod 451, a fifth connecting rod 452, a sixth connecting rod 453, and a second rotating shaft 454. One end of the fourth connecting rod 451 is perpendicularly and rotatably connected to the two first connecting rods 415 of the first link assembly 414, and the fourth connecting rod 451 is located farther away from the second rotating rod 413 than the second connecting rod 441. The other end of the fourth connecting rod 451 is perpendicularly fixed to one end of the fifth connecting rod 452, and the other end of the fifth connecting rod 452 is rotatably connected to one end of the sixth connecting rod 453. The sixth connecting rod 453 and the fourth connecting rod 451 are located on a same side of the fifth connecting rod 452. The second rotating shaft 454 is fixedly connected to the other end of the sixth connecting rod 453 and is rotatably connected to the third rotating pair 46.

The third rotating pair 46 includes a first bracket 461 and a third rotating shaft 462. The first rotating shaft 443 and the second rotating shaft 454 are rotatably connected to the first bracket 461. The third rotating shaft 462 is connected to the first bracket 461 and is rotatably connected to the fixing platform 30 to realize the rotational connection between the third rotating pair 46 and the fixing platform 30.

Specifically, referring to FIG. 1, the first bracket 461 includes two first vertical plates 463 arranged in parallel, a first horizontal plate 464 perpendicularly connected between the two first vertical plates 463, and a third rotating shaft 462 connected to the first horizontal plate 464. The third connecting rod 442 and the sixth connecting rod 453 are located on the outsides of the two first vertical plates 463. Each of the first vertical plates 463 is provided with a first transverse hole 465 parallel to the fixing platform 30, and the first rotating shaft 443 and the second rotating shaft 454 respectively rotatably extend through two first transverse holes 465 to realize the rotational connection between the first rotating pair 44, the second rotating pair 45 and the third rotating pair 46. The first horizontal plate 464 is provided with a first vertical hole 466 aligned with the first positioning hole 323, and a part of the transmission assembly 60 is rotatably received in the first through hole 313, the first positioning hole 323 and the first vertical hole 466. In an embodiment, the third rotating shaft 462 is provided with a limiting hole (not shown) coaxial with the first positioning hole 323 and the first vertical hole 466, and the transmission assembly 60 is rotatably received in the first through hole 313, the first positioning hole 323, the first vertical hole 466 and the limit hole.

The second branch chain 50 includes a second ball pair 51, a fourth rotating pair 56, a fifth rotating pair 54, and a sixth rotating pair 55 that are connected in sequence. The second ball pair 51 is connected to the second platform 20, the fourth rotating pair 56 is connected to the fixing platform 30, and the fifth rotating pair 54 and the sixth rotating pair 55 are the input end 90 of the second multiple degrees of freedom parallel mechanism, which are connected to the other end of the transmission assembly 60. The structures of the second ball pair 51, the fourth rotating pair 56, the fifth rotating pair 54 and the sixth rotating pair 55 and their connection relationships are the same as the structures of the first ball pair 41, the first rotating pair 44 and the second rotating pair and their connection relationships, respectively, and will not be repeated herein. The sizes of the second ball pair 51, the fourth rotating pair 56, the fifth rotating pair 54 and the sixth rotating pair 55 are enlarged or reduced in proportion to the sizes of the first ball pair 41, the first rotating pair 44, the second rotating pair 45 and the third rotating pair 46. The fourth rotating pair 56 is rotatably connected to the second bearing piece 332 of the fixing platform 30. The fifth rotating pair 54 and the sixth rotating pair 55 are rotatably connected to the fourth rotating pair, the rotation axis of the fifth rotating pair 54 is parallel to or coincides with the rotation axis of the sixth rotating pair 55. A rotation axis of the fourth rotating pair 56 is perpendicular to the rotation axis of the fifth rotating pair 54 and the sixth rotating pair 55. When the torque received by the first rotating pair 44 and the second rotating pair 45 is transmitted to the transmission assembly 60, the torque can be transmitted to the fifth rotating pair 54 and the sixth rotating pair 55 through the transmission assembly 60, and then transmitted to the second platform 20 through the second ball pair 51. When the torque received by the first rotating pair 44 and the second rotating pair 45 is transmitted to the fifth rotating pair 54 and the sixth rotating pair 55 through the transmission assembly 60, since the fifth rotating pair 54 and the sixth rotating pair 55 can rotate relative to the fixing platform 30 through the fourth rotating pair 56, the distortions of the fifth rotating pair 54 and the sixth rotating pair 55 can be avoided.

The first multiple degrees of freedom parallel mechanism and the second multiple degrees of freedom parallel mechanism are not limited to the above-mentioned 3-RRRS parallel mechanism, but can also be other parallel mechanisms, such as 3-URS parallel mechanism (URS refers to kinematic pairs of a branched chain consisting of one U pair (universal pair), one R pair (Rotational pair) and one S pair (Spherical pair)), which can realize a parallel mechanism with multiple degrees of freedom. For example, when the first multiple degrees of freedom parallel mechanism and the second multiple degrees of freedom parallel mechanisms are all three degree of freedom parallel mechanisms, the transmission device 1 with multiple degrees of freedom can transmit the movement of three degrees of freedom in space.

Figure 6:
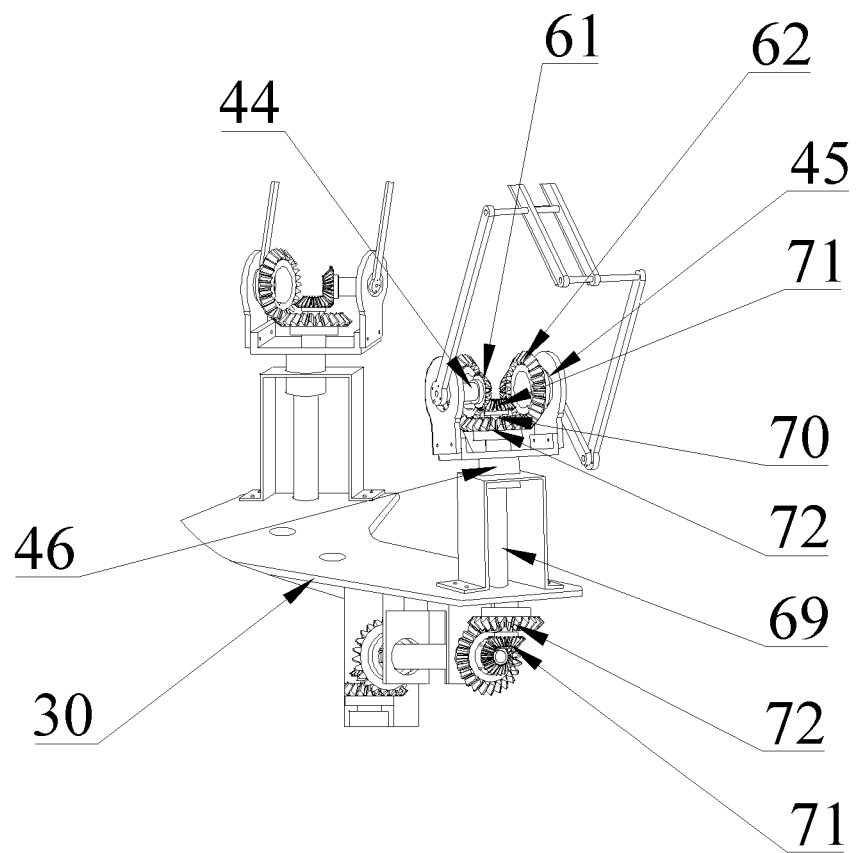
FIG. 6 is a perspective view of a first transmission shaft group according to an embodiment of the present disclosure.

Referring to FIGS. 2, 3 and 6, the transmission assembly 60 includes a first bevel gear 61 connected to the first rotating pair 44, a second bevel gear 62 connected to the second rotating pair 45, a third bevel gear 63 connected to the fifth rotating pair 54, a fourth bevel gear 64 connected to the sixth rotating pair 55, and a linkage assembly 65. A diameter of an index circle of the first bevel gear 61 is smaller than the diameter of the index circle of the second bevel gear 62, and the diameter of the index circle of the third bevel gear 63 is smaller than the diameter of the index circle of the fourth bevel gear 64. The linkage assembly 65 is configured to transmit rotation of the first bevel gear 61 to the third bevel gear 63 and transmit rotation of the second bevel gear 62 to the fourth bevel gear 64.

The linkage assembly 65 includes a first transmission shaft group 66, a second transmission shaft group 67, and a third transmission shaft group 68, the first transmission shaft group 66, the second transmission shaft group 67, and the third transmission shaft group 68 are rotatably connected to the fixing platform 30. The first transmission shaft group 66 is rotatably received in the first through hole 313, the first positioning hole 323 and the first vertical hole 466, and two ends of the first transmission shaft group 66 are respectively located on two sides of the fixing platform 30. The second transmission shaft group 67 and the third transmission shaft group 68 are located on one side of the fixing platform 30, and the first transmission shaft group 66 and the third transmission shaft group 68 are perpendicularly connected to two ends of the second transmission shaft group 67. A plurality of supporting plates 34 are fixed on a side of the fixing platform 30 where the second transmission shaft group 67 and the third transmission shaft group 68 are located. Each of the plurality of supporting plates 34 is provided with a group of coaxial supporting holes 35, a central axis of the supporting hole 35 is parallel to the fixing platform 30, and each second transmission shaft group 67 is rotatably received in the group of supporting holes 35. The third transmission shaft group 68 is rotatably received in the second positioning hole 333 and a hole of the fourth rotating pair 56 corresponding to the first vertical hole 466.

Each of the first transmission shaft group 66, the second transmission shaft group 67, and the third transmission shaft group 68 includes a first shaft 69 and a second shaft 70 rotatably received in the first shaft 69. Both ends of each second shaft 70 are respectively sleeved with a fifth bevel gear 71, and both ends of each first shaft 69 are respectively sleeved with a sixth bevel gear 72. The fifth bevel gear 71 and the sixth bevel gear 72 at an end of the first transmission shaft group 66 adjacent to the first branch chain 40 are engaged with the first bevel gear 61 and the second bevel gear 62 respectively. The fifth bevel gear 71 and the sixth bevel gear 72 at an end of the third transmission shaft group 68 adjacent to the second branch chain 40 are engaged with the third bevel gear 63 and the fourth bevel gear 64 respectively. The fifth bevel gears 71 and the sixth bevel gears 72 at two ends of the second transmission shaft group 67 are engaged with the fifth bevel gear 71 and the sixth bevel gear 72 at the end of the first transmission shaft group 66 away from the first branch chain 40 and the fifth bevel gears 71 and the sixth bevel gears 72 at the end of the third transmission shaft group 68 away from the second branch chain 50, respectively. In this way, the movement between the first bevel gear 61, the second bevel gear 62, and the third bevel gear 63, the fourth bevel gear 64 is transmitted through the fifth bevel gears 71 at both ends of the second shaft 70 and the sixth bevel gears 72 at both ends of the first shaft 69.

In one embodiment, the structure and size of the first bevel gear 61, the third bevel gear 63 and the fifth bevel gear 71 are the same, and the structure and size of the second bevel gear 62, the fourth bevel gear 64 and the sixth bevel gear are the same, so that the transmission assembly 60 transmits the torque on the output end 80 (the first rotating pair 44 and the second rotating pair 45) of the first multiple degrees of freedom parallel mechanism to the input end 90 (the fifth rotating pair 54 and the sixth rotating pair 55) of the second multiple degrees of freedom parallel mechanism at the speed ratio of 1:1.

The transmission assembly 66 is not limited to the above-mentioned bevel gear transmission structure, and can also be other transmission mechanisms, such as a worm gear transmission structure, as long as it can transmit the movement between two multiple degrees of freedom parallel mechanisms.

The present disclosure also provides a robot, which includes the above-mentioned transmission device with multiple degrees of freedom 1. The first platform 10 is a force inputting platform, which is configured to receive the loaded force and/or torque, and the second platform 20 is a force outputting platform, which is configured to process or transfer products through the execution terminal on the force outputting platform.

According to the transmission device 1 with multiple degrees of freedom and the robot, on one hand, when the platform connected to the larger one of the first branch chain 40 and the second branch chain 50 acts as the force inputting platform, the force and/or torque received by the force inputting platform is transmit to the force outputting platform connected to the smaller one of the first branch chain 40 and the second branch chain 50 through the two multiple degrees of freedom parallel mechanisms arranged on both sides of the fixing platform 30, so that the multi-DoF (degrees of freedom) force and/or the torque output to the platform connected to the smaller branch chain can be increased and the displacement output to the platform can be decreased. On the other hand, when the platform connected to the smaller one of the first branch chain 40 and the second branch chain 50 acts as the force inputting platform, the force and/or torque received by the force inputting platform is transmit to the force outputting platform connected to the larger one of the first branch chain 40 and the second branch chain 50 through the two multiple degrees of freedom parallel mechanisms arranged on both sides of the fixing platform 30, so that the multi-DoF force and/or the torque output to the platform connected to the larger branch chain can be decreased and the displacement output to the platform can be increased. In this way, the output multi-DoF force/torque can be amplified or reduced, or the output multi-DoF displacement can be amplified and reduced as needed.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

What is claimed is:

1. A transmission device with multiple degrees of freedom, the transmission device comprising:
   a first platform, a second platform, a fixing platform provided between the first platform and the second platform, a plurality of first branch chains, a plurality of second branch chains, and a plurality of transmission assemblies;
- wherein the plurality of first branch chains are arranged in parallel between the first platform and the fixing platform; the plurality of first branch chains, the first platform, and the fixing platform constitute a first multiple degrees of freedom parallel mechanism;
- wherein the plurality of second branch chains are arranged in parallel between the second platform and the fixing platform; the plurality of second branch chains, the second platform, and the fixing platform constitute a second multiple degrees of freedom parallel mechanism, wherein a structure of the second branch chains is similar to a structure of the first branch chains, and a size of the second branch chains is enlarged or reduced in proportion to a size of the first branch chains;
- wherein the plurality of transmission assemblies are coupled between the plurality of first branch chains and the plurality of second branch chains and configured to couple an output end of the first multiple degrees of freedom parallel mechanism to an input end of the second multiple degrees of freedom parallel mechanism.

2. The transmission device according to claim 1, wherein the plurality of transmission assemblies couple the output end of the first multiple degrees of freedom parallel mechanism to the input end of the second multiple degrees of freedom parallel mechanism with a speed ratio of 1:1.

3. The transmission device according to claim 1, wherein the plurality of first branch chains comprise three first branch chains and the plurality of second branch chains comprise three second branch chains, the three first branch chains, the first platform, and the fixing platform constitute a first 3-RRRS parallel mechanism, and the three second branch chains, the second platform, and the fixing platform constitute a second 3-RRRS parallel mechanism.

4. The transmission device according to claim 3,
- wherein each of the plurality of first branch chains comprises a first ball pair, a first rotating pair, a second rotating pair, and a third rotating pair connected in sequence;
- wherein the first ball pair is connected to the first platform, the third rotating pair is connected to the fixing platform, and the first rotating pair and the second rotating pair are the output end of the first multiple degrees of freedom parallel mechanism;
- wherein each of the second branch chains comprises a second ball pair, a fourth rotating pair, a fifth rotating pair and a sixth rotating pair connected in sequence;
- wherein the second ball pair is connected to the second platform, the fourth rotating pair is connected to the fixing platform, and the fifth rotating pair and the sixth rotating pair are the input end of the second multiple degrees of freedom parallel mechanism.

5. The transmission device according to claim 4,
- wherein each of the plurality of transmission assemblies comprises a first bevel gear connected to the first rotating pair, a second bevel gear connected to the second rotating pair, a third bevel gear connected to the fifth rotating pair, a fourth bevel gear connected to the sixth rotating pair, and a linkage assembly;
- wherein the linkage assembly is configured to transmit rotation of the first bevel gear to the third bevel gear and to transmit rotation of the second bevel gear to the fourth bevel gear.

6. The transmission device according to claim 5, wherein
- the linkage assembly comprises a first transmission shaft group, a second transmission shaft group, and a third transmission shaft group, the first transmission shaft group, the second transmission shaft group, and the third transmission shaft group are rotatably connected to the fixing platform;
- each of the first transmission shaft group, the second transmission shaft group, and the third transmission shaft group comprises a first shaft and a second shaft rotatably received in the first shaft;
- two ends of the first transmission shaft group are respectively located on two sides of the fixing platform, the second transmission shaft group and the third transmission shaft group are located on one side of the fixing platform, and the first transmission shaft group and the third transmission shaft group are perpendicularly connected to two ends of the second transmission shaft group;
- both ends of each second shaft are respectively sleeved with a fifth bevel gear, and both ends of each first shaft are respectively sleeved with a sixth bevel gear;
- the fifth bevel gear and the sixth bevel gear at an end of the first transmission shaft group adjacent to the first branch chain are engaged with the first bevel gear and the second bevel gear respectively;
- the fifth bevel gear and the sixth bevel gear at an end of the third transmission shaft group adjacent to the second branch chain are engaged with the third bevel gear and the fourth bevel gear respectively;
- the fifth bevel gears and the sixth bevel gears at two ends of the second transmission shaft group are engaged with the fifth bevel gear and the sixth bevel gear at the end of the first transmission shaft group away from the first branch chain and the fifth bevel gears and the sixth bevel gears at the end of the third transmission shaft group away from the second branch chain, respectively.

7. The transmission device according to claim 6, wherein the fixing platform further comprises a plurality of supporting plates fixed on a side of the fixing platform where the second transmission shaft group and the third transmission shaft group are located, wherein each of the plurality of supporting plates is provided with a group of supporting holes, and each second transmission shaft group is rotatably received in the group of supporting holes.

8. The transmission device according to claim 3, wherein the fixing platform comprises a fixing plate, three first connecting frames, and three second connecting frames, the fixing plate comprises a central portion and three positioning portions evenly arranged around the central portion at intervals, the three first connecting frames are respectively fixed at one end of the three positioning portions away from the center portion and located on a side of the fixing plate facing the first platform, the three second connecting frames are respectively fixed to one end of the three positioning portions adjacent to the center portion and located on a side of the fixing plate facing the second platform.

9. The transmission device according to claim 8, wherein one end of each positioning portion away from the center portion is provided with a first through hole, the first connecting frame comprises two first fixing pieces perpendicularly fixed to the fixing plate and a first bearing piece perpendicularly connected between the two first fixing pieces, the first bearing piece is provided with a first positioning hole corresponding to the first through hole, and a part of the transmission assembly is rotatably received in the first through hole and the first positioning hole.

10. A robot, comprising:
a first parallel mechanism having multiple degrees of freedom and comprising a first branch chains;
a second parallel mechanism formed by enlarging or reducing the first parallel mechanism and comprising a plurality of second branch chains corresponding to the plurality of first branch chains, wherein the second parallel mechanism is connected to an end of the first parallel mechanism and is inverted on a connection between the first parallel mechanism and the second parallel mechanism relative to the first parallel mechanism; and
a plurality of transmission assemblies connected one-to-one between the plurality of first branch chains and the plurality of second branch chain, wherein a force or torque applied to a first preset position on one of the first parallel mechanism and the second parallel mechanism is transmitted to a second preset position corresponding to the first preset position in the other parallel mechanism through the plurality of transmission assemblies.

11. The robot according to claim 10, wherein when the plurality of transmission assemblies transmit the force or torque between the first parallel mechanism and the second parallel mechanism, a speed ratio of two ends of each transmission assembly is 1:1.

12. The robot according to claim 11, wherein the first parallel mechanism and the second parallel mechanism comprise a common fixing platform, the plurality of first branch chains are connected to one side of the fixing platform, and the plurality of second branch chains are inverted on the other side of the fixing platform relative to the plurality of first branch chains.

13. The robot according to claim 12,
wherein each of the plurality of first branch chains comprises a first ball pair, a first rotating pair, a second rotating pair, and a third rotating pair connected in sequence;
wherein the first ball pair is connected to the first platform, the third rotating pair is connected to the connection, and the first rotating pair and the second rotating pair are connected to one end of the transmission assembly;
wherein each of the second branch chains comprises a second ball pair, a fourth rotating pair, a fifth rotating pair and a sixth rotating pair connected in sequence;
wherein the second ball pair is connected to the second platform, the fourth rotating pair is connected to the connection, and the fifth rotating pair and the sixth rotating pair are connected to the other end of corresponding transmission assembly.

14. The robot according to claim 13,
wherein each of the plurality of transmission assemblies comprises a first bevel gear connected to the first rotating pair, a second bevel gear connected to the second rotating pair, a third bevel gear connected to the fifth rotating pair, a fourth bevel gear connected to the sixth rotating pair, and a linkage assembly;
wherein the linkage assembly is configured to transmit rotation of the first bevel gear to the third bevel gear and to transmit rotation of the second bevel gear to the fourth bevel gear.

15. The robot according to claim 14, wherein
the linkage assembly comprises a first transmission shaft group, a second transmission shaft group, and a third transmission shaft group, the first transmission shaft group, the second transmission shaft group, and the third transmission shaft group are rotatably connected to the fixing platform;
each of the first transmission shaft group, the second transmission shaft group, and the third transmission shaft group comprises a first shaft and a second shaft rotatably received in the first shaft;
two ends of the first transmission shaft group are respectively located on two sides of the fixing platform, the second transmission shaft group and the third transmission shaft group are located on one side of the fixing platform, and the first transmission shaft group and the third transmission shaft group are perpendicularly connected to two ends of the second transmission shaft group;
both ends of each second shaft are respectively sleeved with a fifth bevel gear, and both ends of each first shaft are respectively sleeved with a sixth bevel gear;
the fifth bevel gear and the sixth bevel gear at an end of the first transmission shaft group adjacent to the first branch chain are engaged with the first bevel gear and the second bevel gear respectively;
the fifth bevel gear and the sixth bevel gear at an end of the third transmission shaft group adjacent to the second branch chain are engaged with the third bevel gear and the fourth bevel gear respectively;
the fifth bevel gears and the sixth bevel gears at two ends of the second transmission shaft group are engaged with the fifth bevel gear and the sixth bevel gear at the end of the first transmission shaft group away from the first branch chain and the fifth bevel gears and the sixth bevel gears at the end of the third transmission shaft group away from the second branch chain, respectively.

16. The robot according to claim 15, wherein the fixing platform further comprises a plurality of supporting plates fixed on a side of the fixing platform where the second transmission shaft group and the third transmission shaft group are located, wherein each of the plurality of supporting plates is provided with a group of supporting holes, and each second transmission shaft group is rotatably received in the group of supporting holes.

17. The robot according to claim 12, wherein the fixing platform comprises a fixing plate, a plurality of first connecting frames, and a plurality of second connecting frames, the fixing plate comprises a central portion and a plurality of positioning portions evenly arranged around the central portion at intervals, the plurality of first connecting frames are respectively fixed at one end of the plurality of positioning portions away from the center portion and located on a side of the fixing plate facing the first platform, the plurality of second connecting frames are respectively fixed to one end of the plurality of positioning portions adjacent to the center portion and located on a side of the fixing plate facing the second platform.

18. The robot according to claim 17, wherein one end of each positioning portion away from the center portion is provided with a first through hole, the first connecting frame comprises two first fixing pieces perpendicularly fixed to the fixing plate and a first bearing piece perpendicularly connected between the two first fixing pieces, the first bearing piece is provided with a first positioning hole corresponding to the first through hole, and a part of the transmission assembly is rotatably received in the first through hole and the first positioning hole.

19. The robot according to claim 12, wherein three first branch chains are provided, the first parallel mechanism is 3-RRRS parallel mechanism.

20. The robot according to claim 10, wherein the first parallel mechanism further comprises a first platform, the first platform is connected to ends of the plurality of first branch chains away from the second parallel mechanism, the second parallel mechanism further comprises a second platform corresponding to the first platform, the second platform is connected to ends of the plurality of second branch chains away from the first parallel mechanism, the plurality of transmission assemblies is configured to transmit the force or torque applied to the first platform to the second platform.

* * * * *